(12) United States Patent
Motomi et al.

(10) Patent No.: US 7,448,529 B2
(45) Date of Patent: Nov. 11, 2008

(54) VEHICLE BODY ASSEMBLY METHOD

(75) Inventors: Jyunji Motomi, Ikeda (JP); Isao Kita, Ikeda (JP); Tadao Nasu, Ikeda (JP); Takuji Izutani, Ikeda (JP); Kaname Akagi, Ikeda (JP); Kazuto Ikeda, Ikeda (JP); Hiromichi Arayama, Ikeda (JP)

(73) Assignee: Daihatsu Motor Co., Ltd., Osaka (JP)

( * ) Notice: Subject to any disclaimer, the term of this patent is extended or adjusted under 35 U.S.C. 154(b) by 707 days.

(21) Appl. No.: 10/494,778

(22) PCT Filed: Oct. 1, 2002

(86) PCT No.: PCT/JP02/10235

§ 371 (c)(1),
(2), (4) Date: Sep. 14, 2004

(87) PCT Pub. No.: WO03/039941

PCT Pub. Date: May 15, 2003

(65) Prior Publication Data

US 2005/0017057 A1    Jan. 27, 2005

(30) Foreign Application Priority Data

| Nov. 8, 2001 | (JP) | ............................. 2001-343383 |
| Nov. 8, 2001 | (JP) | ............................. 2001-343388 |
| Nov. 8, 2001 | (JP) | ............................. 2001-343411 |
| Nov. 8, 2001 | (JP) | ............................. 2001-343638 |

(51) Int. Cl.
*B23K 37/04* (2006.01)

(52) U.S. Cl. ..................................... 228/212; 228/44.3

(58) Field of Classification Search ................... 228/4.1, 228/44.3, 47.1, 212; 219/80, 161, 429, 428, 219/430; 29/429, 428, 430
See application file for complete search history.

(56) References Cited

U.S. PATENT DOCUMENTS

| 4,776,084 | A | | 10/1988 | Naruse et al. .................. 29/771 |
| 5,011,068 | A | * | 4/1991 | Stoutenburg et al. .......... 228/4.1 |
| 5,409,158 | A | * | 4/1995 | Angel .......................... 228/182 |
| 5,518,166 | A | * | 5/1996 | Numata et al. ............... 228/182 |
| 5,548,096 | A | * | 8/1996 | Akasaka et al. ........... 219/117.1 |

(Continued)

FOREIGN PATENT DOCUMENTS

EP    0346920    12/1989

(Continued)

*Primary Examiner*—Kevin P Kerns
*Assistant Examiner*—Michael Aboagye
(74) *Attorney, Agent, or Firm*—J.C. Patents (57) ABSTRACT

Objectives of the present invention are to reduce the size and weight of side-member and roof jigs, and to simplify analysis of problems related to ease-of-assembly of vehicle body roofs and side-members. In a first step, using clamping jigs 11-1 through 11-4, a left and right pair of side-members 4 are positioned with respect to an underbody 3 (that was positioned at a prescribed position in a vehicle body assembly line 2), and welded in place. Continuing in a second step, after the clamping jigs 11-1 through 11-4 have been released, a roof 31 is placed on upper welding edges of the left and right side-members 4 while being positioned using suspension jigs 35 and 36, after which it is welded in place.

4 Claims, 9 Drawing Sheets

U.S. PATENT DOCUMENTS 6,138,889 A * 10/2000 Campani et al. ............. 228/4.1
6,344,629 B1 * 2/2002 Kato et al. ................. 219/148

FOREIGN PATENT DOCUMENTS

| JP | 57-182574 | 11/1982 |
| JP | 59-114174 | 7/1984 |
| JP | S61-148878 | 9/1986 |
| JP | 03-013115 | 1/1991 |
| JP | 05-124549 | 5/1993 |
| JP | 05-185967 | 7/1993 |

* cited by examiner

VEHICLE BODY ASSEMBLY METHOD

FIELD OF THE INVENTION

The present invention relates to a vehicle body assembly method, and in particular to (1) an assembly method for use when welding left and right side-members to an underbody (claims 1 and 2); (2) an assembly method in which a step of welding left and right side-members to an underbody, and a step of placing a cross-member such as a roof between the tops of the two side-members and welding it in place are divided into completely separate steps (claim 3); and (3) a method for use when tack-welding a cross-member such as a roof, header or frame-back between the tops of left and right side-members attached to an underbody (claim 4).

BACKGROUND ART

The main members in the body of a vehicle are an underbody, left and right side-members and a roof. These main members are relative-positioned using a variety of positioning jigs, and are tacked in the positioned state by spot-welding using welding robots, after which final welding is performed.

In conventional vehicle body assembly methods, however, coarse positioning jigs are commonly used to position the main members. In some cases, for example, very large folding screen-type jigs are used to position the side-members and roof In body assembly methods that use such large jigs, provided on the left and right sides of the body assembly line are side-member jigs configured so that they can be shifted back and forth; and provided above the assembly line is a roofjig configured so that it can be raised and lowered. Left and right side-members are transported by conveyers to the fronts of their respective jigs and set in the jigs. The jigs are then moved forward to position them at the prescribed location on the underbody, and the side-members are welded to the underbody. With the side-members still supported by positioning jigs, a roof, supported by a separate jig, is placed across the tops of the side-members, and left and right weld edges of the roof are welded to upper weld edges of the left and right side-members.

Because such folding screen-type jigs are large and heavy, they drive up the initial cost of plant facilities. Also, when there is a change in the model being produced and retooling of the line is required, the existing jigs have to be removed from the jig drive mechanisms and new ones installed. This is extremely time consuming work that brings the production line to a complete stop.

Some conventional vehicle body assembly methods use revolving jigs to speed up the retooling process. When revolving jigs are used, however, because a triangular column is required to support three vehicle body models and a square column is required for four, the equipment is even larger and heavier than when folding screen-type jigs are used, and initial plant facility costs are driven even higher.

Also, the left and right pair of side member jigs and the roofjig are independent of each other, and for the positioning/welding of the roof to the side-members to be accurate, designated vehicle body positions of these three jigs must be accurate with respect to a stationary system referenced to the ground. The side-member jigs are installed in drive means for moving them back and forth and the roofjig is installed in a drive means for moving it up and down; and the positional accuracy of these drive means themselves affect how accurately the roof and side-members can be welded to each other. Because these drive means are required to move the bulky and heavy jigs back and forth or up and down at high rates of speed, maintaining their strict positioning accuracy demands a high level of skill and constant maintenance.

Also, gradual degradation of positioning accuracy over time can occur as moving parts in the drive means become worn.

Also, the left and right pair of side-member jigs and the roofjig are independent of each other, but because the welding edges of all three jigs make contact with the left and right side-members and roof of the vehicle at the same time, this can easily give rise to interfering forces between the three jigs. There is no problem if the forces are balanced between the left and right sides of the vehicle, but variances in the positioning precisions of the jigs, clamping anomalies, etc. can cause forces to be biased toward the left or right side-member. When such force bias occurs, it causes the side-members to tilt leftward or rightward away from the vertical. This distorts the front and rear window openings, which interferes with proper installation of the windshield and rear window glass.

Because inaccurate positioning between the roof and side-members shows up most prominently in distorted front and rear window openings, a very small positioning error can create major problems for installation of the windshield and rear window glass. In roof positioning methods that used large conventional jigs, it was impossible to simultaneously press the roof against the weld edges of the left and right side-members with even pressure because the weld edge of the roof tended to make first contact with only one of the side-member weld edges. When uneven contact between the roof and the left and right side-members occurs, it can cause minor degradation of the accuracy of positioning between the roof and the left and right side-members.

Such problems can be checked for during prototyping, and corrective adjustments made, but it can take a huge amount of time and effort to properly and analyze and isolate the sources of the problems.

DESCRIPTION OF THE INVENTION

A first object of the present invention is to reduce the size and weight of side-member jigs used when tack-welding side-members to the left and right sides of vehicle underbodies, thereby reducing initial investment in plant facilities, and providing faster and easier retooling.

A second object of the present invention is to provide a vehicle body assembly method that will enable jigs for side-members and roof to be made smaller and lighter, that will reduce initial investment in plant facilities, that will make it easier and faster to retool, and that will facilitate analysis of problems related to ease-of-assembly of side-members and roof.

A third object of the present invention is to provide a vehicle body assembly method that can reduce the size and weight of roof jigs, thereby reducing initial investment in plant facilities and making it easier and faster to retool the line, and that can also facilitate more accurate positioning and tack-welding of cross-members (roof, header, frame-back, etc.) to side-members, without using any large drive means for raising and lowering jigs.

A first vehicle body assembly method of the present invention is a vehicle body assembly method characterized in that on an underbody positioned in a prescribed position of a vehicle body assembly line, a left and right pair of side-members are placed in a vertically erect state such that lower welding edges thereof are aligned with left and right welding edges of the underbody; and a total of at least four locations fore and aft on the lower welding edges of the vertically erect left and right side-members and the underbody are joined together and clamped in place by at least four clamping jigs, provided in prescribed locations, for welding the side-members to the underbody in this joined and clamped state.

The transporting and vertical placement of side-members can be accomplished using general-purpose robots. Side-members brought to a location near a general-purpose robot can be picked up by the robot, moved as-is to the prescribed location on the underbody and placed there in a vertically erect state. With the side-members in this vertically erect state, four pre-positioned clamping jigs operate to join and clamp the lower welding edges of the left and right side-members to the underbody in at least four locations total, fore and aft, where they are then welded by a welding robot.

The approach used in the design of conventional jigs used for side-members was to clamp the entire side-member, which meant that the jig had to be a size or two larger than the side-member. In the present invention, however, rather than clamping the entire side-member, a general purpose transporter robot, etc., is given the job of constraining side-member tilt, and only fore and aft portions of the lower welding edge are constrained in the left-right, fore-aft and up-down directions by four clamping jigs. This enables the four clamping jigs to be made small and light-weight, which greatly reduces initial plant facility costs. Also, because the clamping jigs are smaller and lighter, they can easily be moved around by general-purpose robots, etc., which makes retooling easier and faster, and reduces the cost of retooling equipment and facilities. Also, because the clamping jigs are smaller, space-saving standby stock areas for clamping jigs can easily be provided by building appropriate racks for them beside the assembly line.

A second vehicle body assembly method of the present invention is a vehicle body assembly method wherein, on an underbody positioned at a prescribed location in a vehicle body assembly line, a left and right pair of side-members are placed in a vertically erect state such that lower welding edges thereof are aligned with left and right welding edges of the underbody; and a total of at least four locations fore and aft on the lower welding edges of the vertically erect left and right side-members and the underbody, are joined together and clamped in place by at least four clamping jigs provided in prescribed locations, for tack-welding the side-members to the underbody in this joined and clamped state; wherein provided are slide plates, two fore and two aft, at the left and right sides of the prescribed location in the vehicle assembly line in which the underbody is positioned, facing toward the assembly line and moveable back and forth, for attachably/releasably loading clamping jigs thereon; and a raiseable/lowerable elevator platform at the retracted position of each slide plate, for attachably/releasably loading the clamping jigs thereon; said method being such that the elevator platform is raised, and a clamping jig is transported (here, and hereinafter, to include entirely manual transport, semi-automatic transport using auxiliary equipment such as hoists, and fully automatic transport by transporter equipment such as robots) to the raised elevator platform, and loaded thereon by a robot, for transferring the clamping jig to a slide plate in its retracted position by lowering the elevator platform; the slide is then moved forward, and the side-members are joined and clamped to the underbody by the clamping jig; the elevator platform is again raised for placing thereon a different clamping jig, transported in advance thereto by a robot, for retooling purposes; and to retool, the clamping jig on the slide plate in its forward position is lifted off by a robot, and the empty slide plate is retracted, after which the elevator platform is lowered, for transferring the next clamping jig onto the slide plate.

The transporting and vertical placement of side-members can be accomplished using general-purpose robots. Side-members brought to a location near a general-purpose robot can be picked up by the robot, moved as-is to the prescribed location on the underbody and placed there in a vertically erect state. With the side-members in this vertically erect state, four pre-positioned clamping jigs operate to join and clamp the lower welding edges of the left and right side-members to the underbody in a total of at least four locations fore and aft, where they are then welded by a welding robot.

The approach followed with conventional side-member jigs was to clamp the entire side-member, which meant that the jig had to be a full size or two larger than the side-member. In the present invention, however, rather than clamping the entire side-member, a general purpose transporter robot, etc., is temporarily given the job of constraining side-member tilt, and only fore and aft portions of the lower welding edge are constrained in the left-right, fore-aft, up-down directions by four clamping jigs. This enables the four clamping jigs to be made small and light-weight, which greatly reduces initial plant facility costs. Also, because the clamping jigs are smaller and lighter, they can easily be moved around by general-purpose robots, etc., which makes retooling easier and faster, and reduces the cost of retooling equipment and facilities. Also, because the clamping jigs are smaller, space-saving standby stock areas for clamping jigs can easily be provided by building appropriate racks for the jigs beside the assembly line.

To prepare for retooling, the jigs to be used for the next model are placed on the elevator platforms. When the jigs currently being used come out at the forward sides of the slide guides, they are picked up by robots, the slide plate is retracted, and the elevator platform lowered. Now, the slide plate need only be moved forward to begin clamping operations for the next body model, resulting in an extremely short tack time.

A third vehicle body assembly method of the present invention is characterized in that it comprises a first step of using a first jig to position a left and right pair of side-members with respect to an underbody positioned in a prescribed location in a vehicle body assembly line, aligning lower welding edges of the side-members with left and right welding edges of the underbody and welding them; and a second step of releasing the first jig, then placing a cross-member such as a roof, header or frame-back between upper welding edges of the left and right side-members, and using a second jig for positioning, aligning the left and right welding edges of the cross-member with the upper welding edges of the left and right side-members, and welding the upper welding edges to the left and right welding edges in this positioned state.

In the above first step, the left and right side-members are positioned with respect to the underbody. In the second step, after the first jigs, used in the first step, are released, a cross-member such as a roof, header or frame-back is positioned, using the second jigs, and welded. This avoids any possibility of interfering forces occurring between the first and second jigs, thus greatly reducing the time required to analyze any side-member-to-cross-member assembly problems. Also, because there can be no interfering forces between jigs, the jigs can be made smaller and lighter. This will serve to reduce initial plant facility costs, and make retooling faster and easier.

A fourth vehicle body assembly method of the present invention is characterized in that it comprises aligning lower welding edges of a left and right pair of side-members with left and right welding edges of an underbody positioned at a prescribed location in a vehicle body assembly line, and welding them; then coarsely placing a cross-member such as a roof, header or frame-back between upper welding edges of the left and right side-members such that the left and right welding edges of the cross-member are aligned with the upper welding edges of the side-members; placing, transverse to and above the coarsely placed cross-member at one forward and one aft location thereof, suspension jigs, the two ends, left and right, of which are attachably/releasably supported on a suspension frame extending upward from the ground; and using a left and right pair of clamping jigs powered from a common source routed to the suspension jig, to join and clamp fore and aft portions of the upper welding edges of the side-members to fore and aft portions of the left and right welding edges of the cross-member, and tack-welding the welding edges of the side-members and cross-member in this joined and clamped state.

When a cross-member such as a roof, header or frame-back coarsely placed between the tops of a pair of side-members is clamped to the side-members by suspension jigs, portions of the welding edges of the cross-member and side-members are fixed-positioned within the stationary system, through the suspension frame. The upper and lower welding edges of the side-members are therefore all positioned with respect to the stationary system. A total of four locations on welding edges, from the corners to both ends of the cross-members, are all also positioned with respect to the ground. Because the side-members and cross-member are tack-welded in this positioned state, there will be no distortion of the front and rear window openings, and front and rear window openings of the desired shape will be obtained.

The suspension jigs are much smaller and lighter than conventional roofjigs. This provides a large reduction in initial plant facility costs in that retooling stock areas and jig transporter robots can be set up beside the roof tacking station, thus eliminating the need to use a jig conveyer line, and making rapid retooling possible.

The left and right clamping jigs provided on each suspension jig are both driven by the same power source. This synchronizes the left-right timing of the joining-clamping of fore and aft portions of the left and right welding edges of the cross-member to fore and aft portions of the upper welding edges of left and right members. This reduces to the greatest possible extent front and rear window opening distortion due to joining-clamping timing.

The effects of said first through fourth body assembly methods of the present invention are described below.

In the first method of the present invention, as described above, a total of at least four locations fore and aft on the lower welding edges of left and right side-members that have been set in place on an underbody are joined to the underbody, and clamped in place by at least four clamping jigs provided in prescribed locations, for welding the side-members to the underbody in this joined and clamped state. Therefore, compared with conventional assembly methods using large clamping jigs to clamp an entire side-member, the present method provides opportunities for major reductions in size, major reductions in initial plant facility costs, and faster retooling operations. Also, in conventional methods, three operations were required: (1) setting the side-members in place relative to the clamping jigs, (2) operating the jigs to clamp the side-members, and (3) setting the side-members on the underbody by moving the jigs forward. In the present mode of the invention, however, this work is accomplished with just two operations: (1) setting the side-members on the underbody, and (2) operating the jigs to clamp the side-members. This reduces by 1 the number of times the side-members have to be received and handed over, thus greatly improving tack time and reducing the possibility of damaging the side-members during handling.

In the second method of the present invention, as described above, a total of at least four locations fore and aft on the lower welding edges of left and right side-members that have been set in place on an underbody are joined to the underbody and clamped in place by at least four clamping jigs provided in prescribed locations, for welding the side-members to the underbody in this joined and clamped state. Therefore, compared with conventional assembly methods that used large clamping jigs to clamp an entire side-member, the present method provides opportunities for major reductions in size, major reductions in initial plant facility costs, and faster retooling operations. In particular, because of this reduction in the size and weight of the clamping jigs, change-out of clamping jigs to switch the line over to a different body model can be performed by robots. Also, with the configuration using a combination of slide plates and elevator platforms for moving clamping jigs, to prepare for retooling, the jigs to be used for the next model are simply placed on the elevator platforms. When the jigs currently being used come out at the forward ends of the slide guides, they are picked up by robots, the slide plate is retracted, and the elevator platform lowered. Now, the slide plate need only be moved forward to begin clamping operations for the next body model. This results in an extremely short tack time.

In the third method of the present invention as described above, in a first step, a left and right pair of side-members is welded to an underbody using first jigs, and in the following second step, with the first jigs released, a roof is welded to the left and right side-members using second jigs. This eliminates the possibility of creating interfering forces between first jigs, used for the side-members, and the second jigs, used for the roof. With no interfering forces to contend with, the jigs can be made smaller and lighter, thus serving to reduce initial plant facility costs, and to make retooling easier and faster. In this method, the first jigs position the side-members in the fore-aft and up-down directions, and the second jigs position the side-members in the lateral tilt direction. Therefore, if there are problems with shape distortion of the front and rear window openings, it will be relatively simple to analyze cause-and-effect relationships between the first and second jigs and the distortion.

In the fourth method of the present invention, as described above, a roof that has been coarsely placed between the tops of a pair of side-members is joined-clamped to the side-members by the clamping jigs of suspension jigs, thereby positioning the joined portions with respect to the ground-side stationary system. Thus the upper and lower welding edges of the side-members are all positioned with respect to the stationary system, and four locations on the welding edges at the corners of the roof are all positioned with respect to the ground. Because the roof is tack-welded to the side-members in this positioned state, there will be no distortion of the front or rear window opening, and front and rear window openings of the desired shapes will therefore be obtained. Also, the suspension jigs can be made much smaller and lighter than the roof jigs used in conventional methods, which reduces initial plant facility costs, and makes retooling faster and easier. Also, since general-purpose robots are adequate for change-out of suspension jigs for retooling, the large drive means for raising and lowering jigs in conventional methods are no longer necessary, and this can also provide major savings in initial plant facility costs. Also, in the present invention, a common source of drive power is used to open and close the left and right clamping jigs of the suspension jigs, which makes the timing of the opening and closing of the left and clamping jigs fully synchronous. In other words, when the roof is joined with and clamped to the side-members, the left and right sides are clamped at precisely the same time, thus preventing errors in the positioning accuracy between the roof and the side-members that occur when there is a shift in timing between the clamping of left and right sides. Because of this, shape distortion of front and rear window openings is held to the absolute minimum.

BEST MODE FOR CARRYING OUT THE INVENTION

Figure 1:
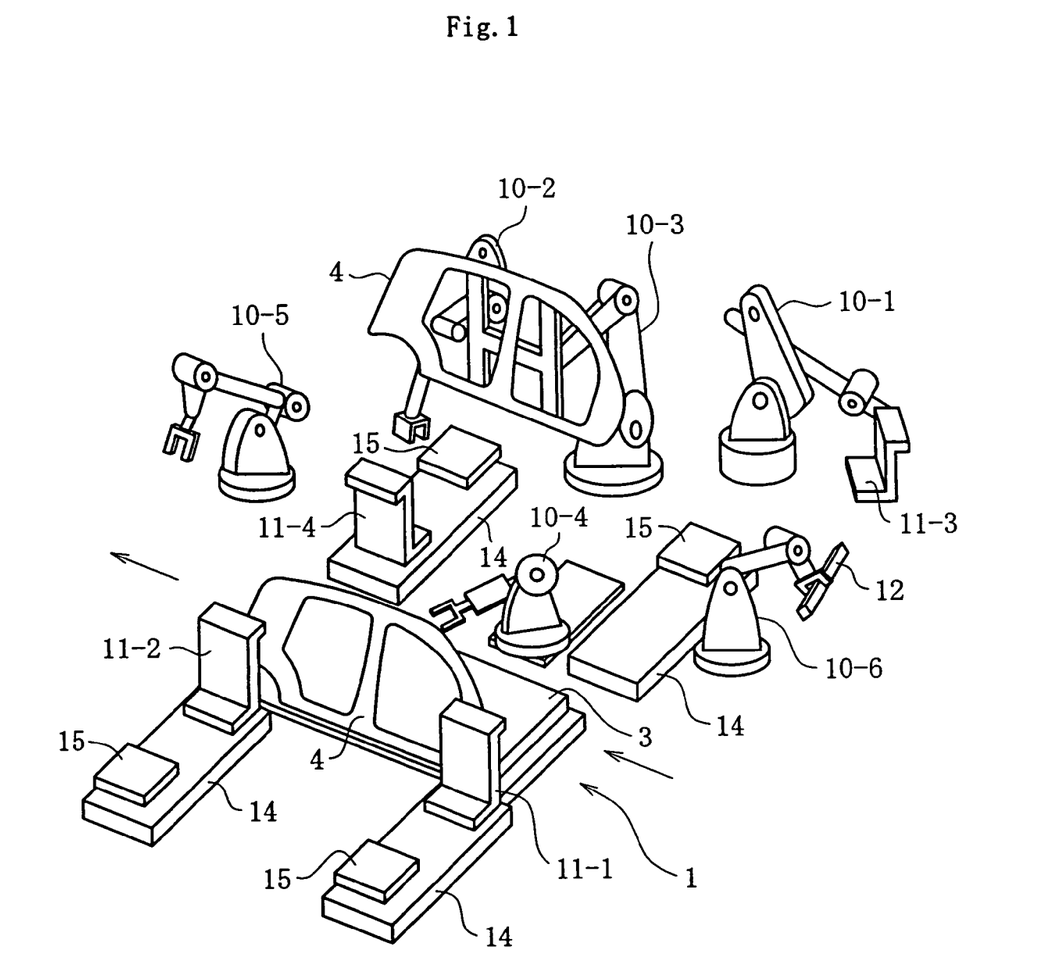
FIG. 1 is an oblique view of a side-member tacking station.
Figure 5:
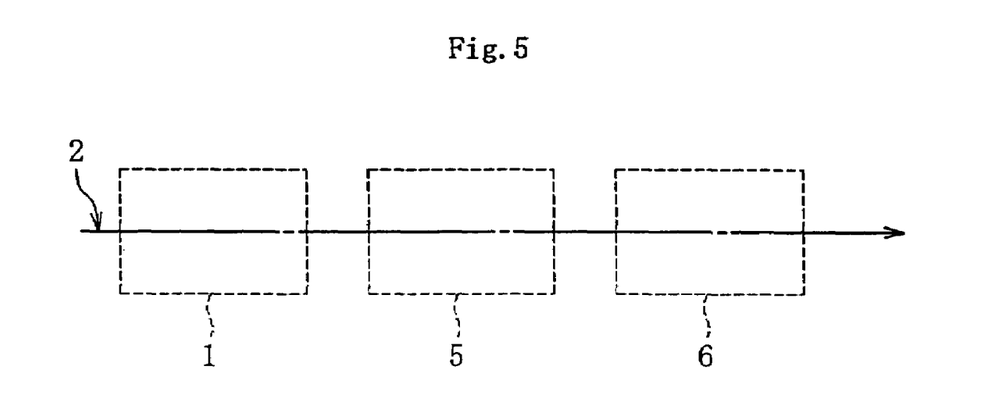
FIG. 5 is a simplified plan view of a vehicle body assembly line.

The best mode for carrying out the present invention will be described below with reference to the drawings. FIG. 1 is a simplified drawing of a side-member tacking station 1. As shown in FIG. 5, this side-member tacking station 1 is placed at its designated position within a vehicle body assembly line 2. Provided in the body assembly line 2 at the upstream end of the side-member tacking station 1, is an underbody assembly line whereby an underbody 3 such as that shown in FIG. 2, assembled for example such that the rear end of the body faces forward, is conveyed to the side-member tacking station 1. As shown in FIG. 5, provided in sequence in the assembly line, downstream of the side-member tacking station 1, are a roof coarse placement station 5, which is also used for finish-welding of the lower welding edges of side-members 4, and a roof tacking station 6. Provided downstream of the roof tacking station 6 is a roof finish-welding station.

As shown in FIG. 1, provided in the side-member tacking station 1 are a plurality of robots 10-1 through 10-6 and clamping jigs 11-1 through 11-4. Here, side-members 4 are tack-welded to the left and right sides of an underbody 3 that has been positioned in the vehicle body assembly line 2, and a cowl outer member 12 is welded to the front.

The side-member tacking station 1 comprises slide-guides 14 placed opposite each other on the left and right sides of the body assembly line 2, one set forward and set one aft, for guiding a slide plate 13; elevator platforms 15, placed at the rear ends of these slide guides 14; jig change-out robots 10-1 and 10-2 for placing four to-be-used clamping jigs 11-1 through 11-4 on the elevator platforms 15, and removing already used clamping jigs 11-1 through 11-4 from the slide plate 13; a first transporter robot 10-3, placed between the jig change-out robots 10-1 and 10-2, for transporting side-members 4; a welding robot 104, placed between slide guides 14, at a slightly lower elevation; a separate welding robot 10-5 placed forward of the slide guides 14; and a second transporter robot 10-6, placed aft of the slide guides 14, for setting cowl outer members 12 at the front and rear end of a vehicle body.

Figure 4:
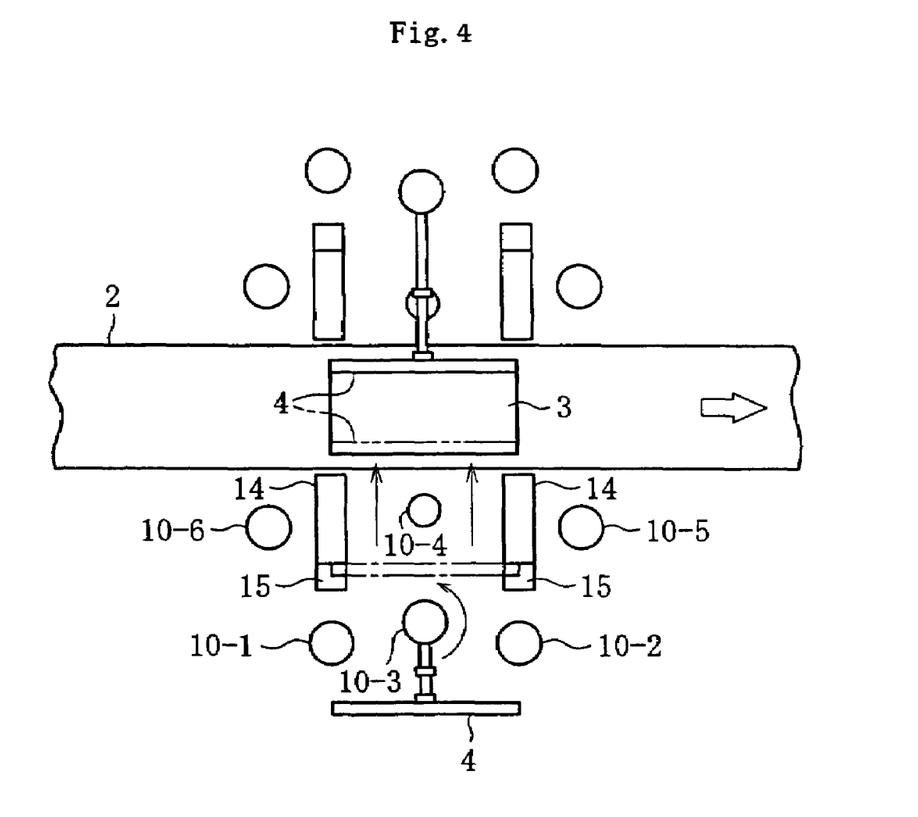
FIG. 4. is a plan view of a side-member tacking station.

As shown in FIG. 4, the slide guides 14 are placed at right angles to the body assembly line 2, between the jig change-out robots 10-1 and 10-2. Placed on the slide guides 14 is a slide plate 13, which is moved back and forth by a slide drive means. Removably/replacably placed on this slide plate 13, are the clamping jigs 11-1 through 11-4. These clamping jigs 11-1 through 11-4 clamp fore and aft portions of welding edges on the left and right sides of an underbody 3 to fore and aft portions of the lower welding edges of side-members 4, while at the same time positioning them relative to each other, and to a stationary system that includes the ground. (No details relative to the clamp portion of these clamping jigs will be described.) Placed on the top surface of the slide plate 13 are couplers (not shown in the drawing) for connecting to an air system that is the drive source for the clamp portions of the clamping jigs 11-1 through 11-4, and to an electrical control system. This quick coupling/decoupling capability is what makes it possible for the clamping jigs 11-1 through 11-4 to perform their clamping functions as required.

Figure 6:
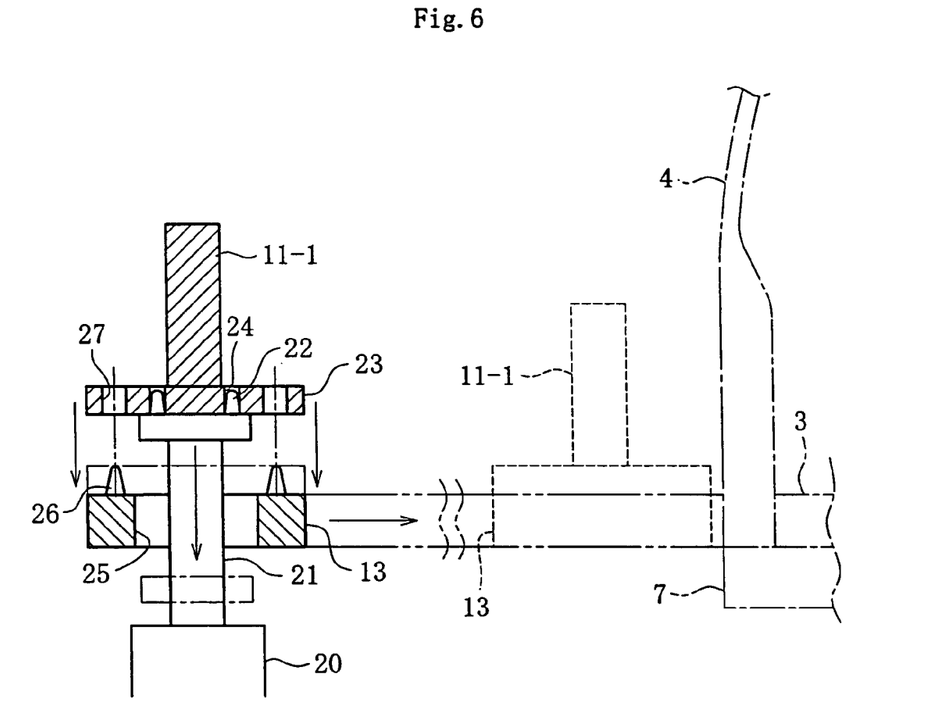
FIG. 6 is a side view of a slide plate for placing a jig thereon, and an elevator platform.

As shown in FIG. 6, each elevator platform 15, located at the back end of a slide guide 14, is attached to the top end of a rod 21 of an upward-pointing vertical cylinder 20 provided such that the elevator platform 15 can be raised and lowered by extending and retracting the rod 21. Provided on the top of the elevator platform 15 are a plurality of positioning pins 22. When the jig change-out robots 10-1 and 10-2 load the next set of clamping jigs to be used (11-1, 11-2, 11-3, 11-4) on the elevator platforms 15, each of the positioning pins 22 mates with a centering hole 24 provided in a jig seat 23. Formed in the center of each slide guide 14 is a through-hole 25 that is larger than the elevator platform 15, and provided around the periphery of this through-hole 25 are a plurality of positioning pins 26 that have a lock function. When the slide plate 13 is retracted to the ends of the slide guide 14 and the elevator platforms 15 lowered, the jigs 11 -1 through 11-4 are transferred onto the slide plate 13, and the positioning pins 26 mate into holes 27 provided around the periphery of the jig seat 23. When the elevator platform 15 is lowered, it passes down through the through-hole 25 in the slide plate 13 and comes to a stop at a position somewhat below the horizontal travel path of the slide plate 13.

Figure 7:
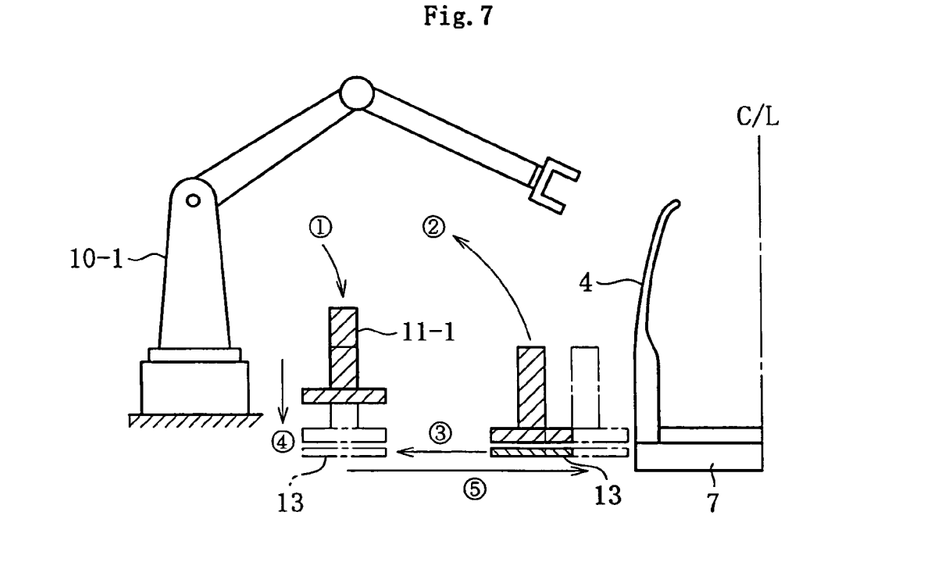
FIG. 7 is a side view drawing showing jig change-out transfer operation for changing-out a side-member jig.

To support retooling requirements, a number of different types of clamping jigs 11-1 through 114 for different body models are placed in stock near the jig change-out robots 10-1 and 10-2 where they can be picked up by those robots and loaded onto elevator platforms 15, as shown at (1) in FIG. 7. The jigs 11-1 through 11-4 thus loaded onto elevator platforms 15, are transferred onto a waiting slide plate 13 at the end of the slide guide 14 by lowering the elevator platforms 15, as shown at (2) in FIG. 7, while at the same time making connections to the air and electrical systems. The slide plate 13 with the jigs 11-1 through 11-4 loaded thereon is pushed forward, as shown at (5) in FIG. 7, by a slide drive means, where the mutually contacting welding edges of an underbody 3 transported to the side-member tacking station 1, and side-members 4 transported by the first transporter robot 10-3 are clamped in four locations: two locations each, fore and aft. In this clamped state, the underbody 3 and side-members 4 are tack-welded by the welding robots 104 and 10-5, after which the clamps of the clamping jigs 11-1 through 11-4 are released and the jigs are retracted slightly, along with the slide plate 13, from the location indicated by the dashed lines in FIG. 7 to the location indicated by the solid lines, where they wait for the next underbody 3 and side-members 4 that are to be tack-welded. When retooling is to be performed, with the clamping jigs in their waiting positions, the jig change-out robots 10-1 and 10-2 remove the jigs 11-1 through 11-4, as shown at (2) in FIG. 7, and return them to their prescribed locations in a jig stock area near those robots. After clamping jigs 11-1 through 11-4 have been loaded on the elevator platforms 15 by the jig change-out robots 10-1 and 10-2, they become 'use completed' items, and are therefore removed by the same robots 10-1 and 10-2, as shown at (2) in FIG. 7. Thus the retooling operation for one clamping jig is performed by one jig change-out robot 10-1 (or 10-2), but since the next jigs 11-1 through 11-4 for retooling are already loaded on the elevator platforms 15, after the 'use completed' jigs 11-1 through 11-4 have been removed, as shown at (2) in FIG. 7, when the slide plate 13 is retracted and elevator platform 15 lowered, the slide plate 13 need only be moved forward to make the station ready to start clamping operations for the new model in an extremely short tack time.

Because the jigs 11-1 through 11-4 are much smaller than their counterparts used in conventional methods, a stock of jigs 11-1 through 11-4 for retooling can always be maintained in the proximity of the jig change-out robots 10-1 and 10-2, which means that during retooling, the required jigs 11-1 through 11-4 can immediately be picked up by the change-out robots 10-1 and 10-2. On this point, it would be difficult, space-wise to keep an adequate ready stock of the large jigs such as are used in the conventional methods immediately adjacent to the body assembly line 2. Normally, such jigs are kept at a stock location separated somewhat from the body assembly line 2, a location from which they are transported to the side-member tacking station 1 by a special conveyer line. By using the compact clamping jigs 11-1 through 11-4 of the present mode of the invention, then, the need for the jig conveyer lines required for conventional methods can be eliminated.

Figure 2:
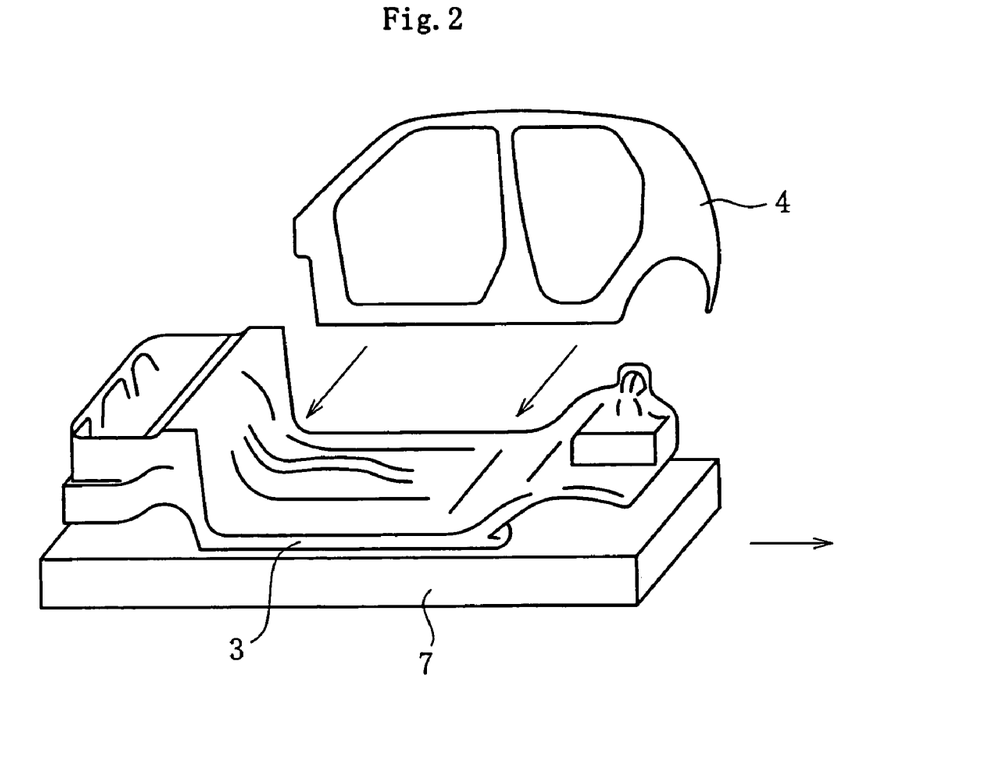
FIG. 2 is an oblique view of a vehicle underbody and a side-member.
Figure 3:
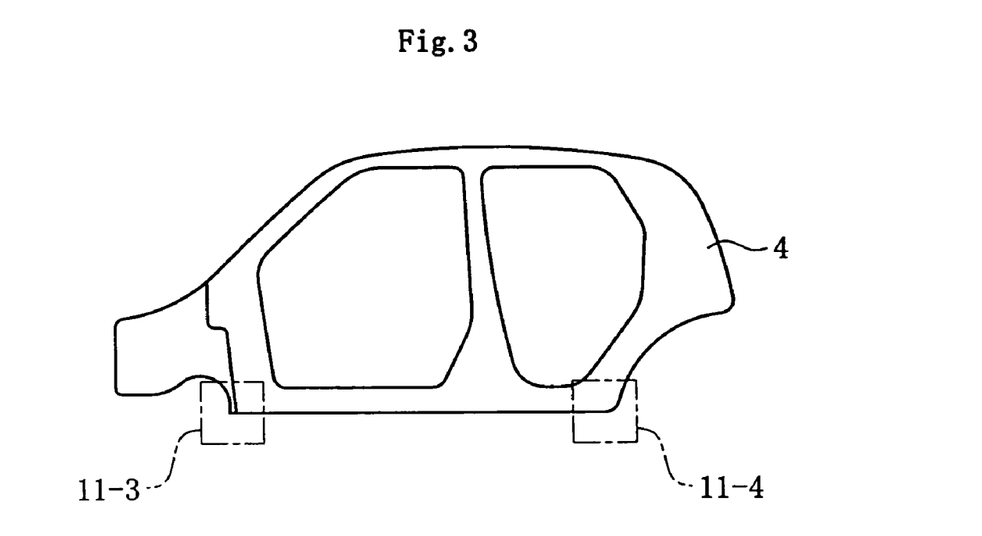
FIG. 3 is a side view of a side-member in a side-member tacking station.

The first transporter robot 10-3, shown in FIG. 1, receives side-members 4 brought to it by a conveyer means (not illustrated), and sets them, as shown in FIG. 2, in their prescribed positions on an underbody 3 that has been transported to the side-member tacking station 1. This 'setting' of the side-members 4 establishes contact between a bottom welding edge of each side-member 4 and both the left-side and right-side welding edges of the underbody 3. The positioning of the side-members 4 by the first transporter robot 10-3 at this stage is accurate to a degree, but since the positioning accuracy obtainable by a robot is limited, a more precise positioning of the side members 4 is performed using the clamping jigs 11-1 through 11-4 as described above.

In conventional methods, three operations were required: (1) setting the side-members 4 in place relative to the clamping jigs, (2) operating the jigs to clamp the side-members 4, and (3) setting the side-members 4 on the underbody 3 by moving the jigs forward. In the present mode of the invention, however, the same thing is accomplished with just two operations: (1) setting the side-members 4 on the underbody 3, and (2) operating the jigs to clamp the side-members 4. This reduces by 1 the number of times the side-members 4 have to be taken and handed over, thus greatly improving tack time, and reducing the possibility of damaging the side-members 4 during handling.

Figure 8:
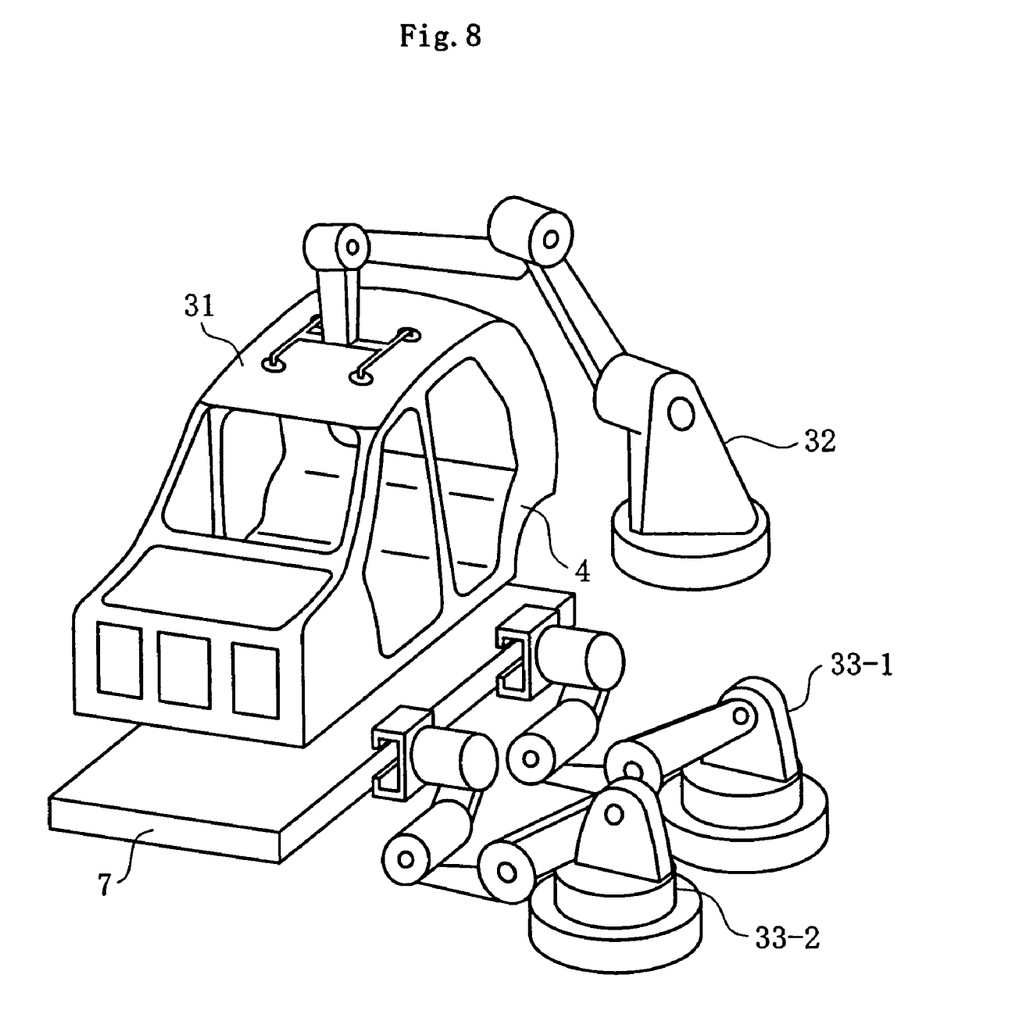
FIG. 8 is an oblique view of a roof coarse placement station.
Figure 9:
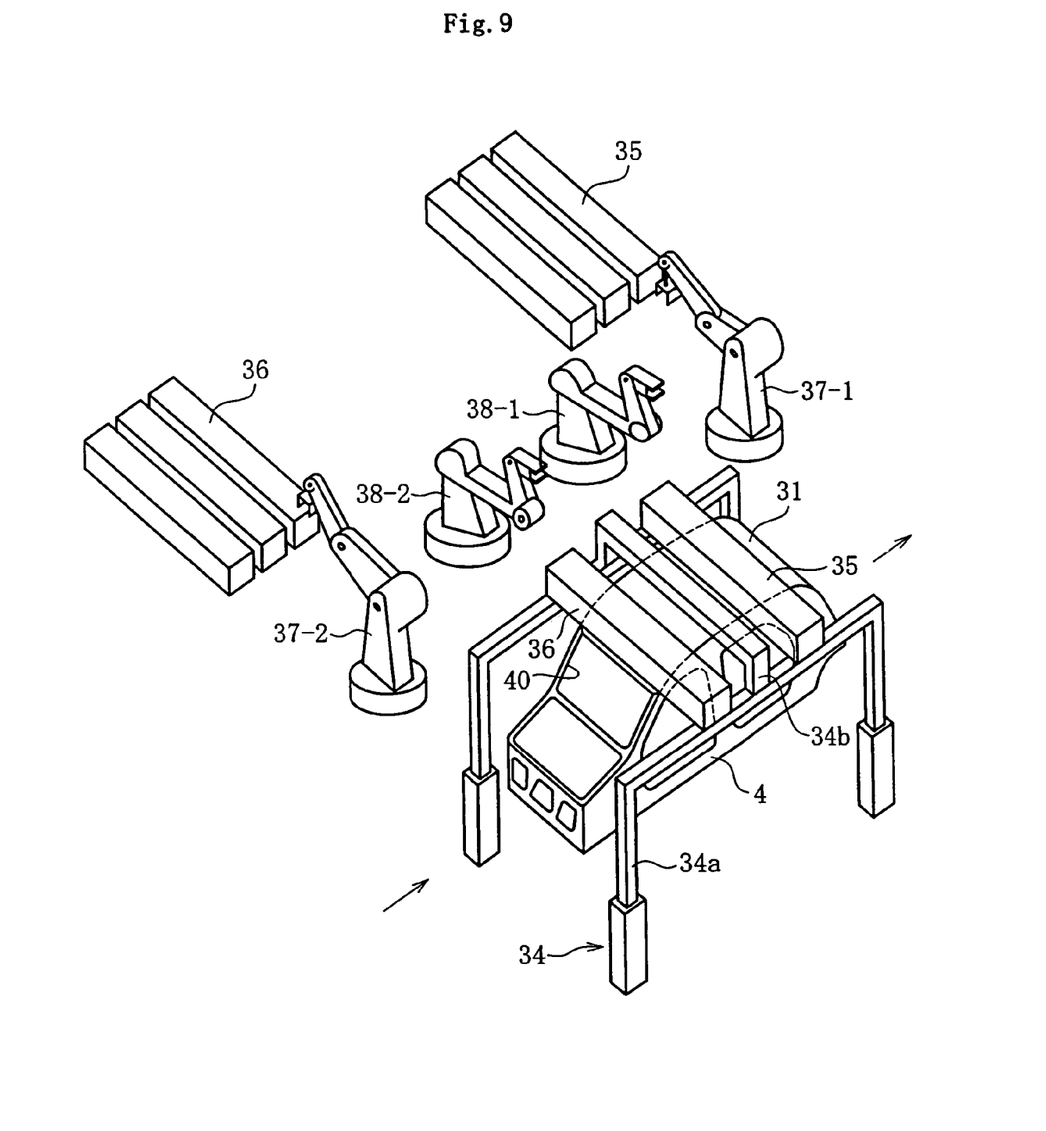
FIG. 9 is an oblique view of a roof tacking station.
Figure 10:
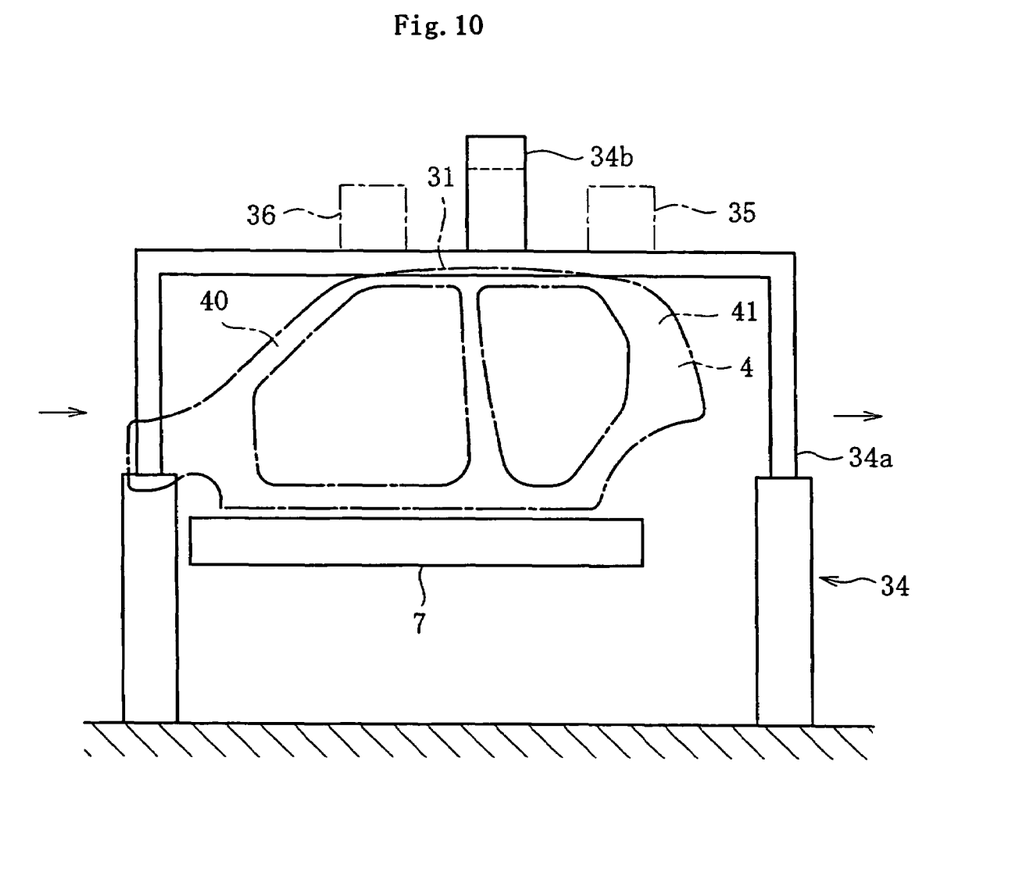
FIG. 10 is a side view of a roof tacking station.

Next, the roof coarse placement station 5 will be described with reference to FIG. 8. The purpose of this station 5, is to perform coarse placement of a roof 31 by suspending it between the tops of a pair of side-members 4 tack-welded to the left and right sides of an underbody 3, and also to perform final welding of the side-members 4 to the underbody 3. The roof coarse placement station 5 has a third transporter robot 32 for transporting a roof 31 and setting it in place on the side-members 4, and two welding robots 33-1 and 33-2 for each side, for a total of four welding robots for final-welding the lower welding edges of the side-members 4. It is to be noted that the roof 31 and side-members 4 are provided with conventional male-female mating structures that serve to prevent inter-positioning errors in the front-to-rear direction.

Moreover, in the present mode of the invention, the roof coarse placement station 5 can also support placement of cross-members (headers, frame-backs, etc.) other than the roof 31 between the left and right side-members 4. A header or frame-back may, for example, be installed on the underside of the roof 31 beforehand, or may be installed front and rear between the side-members 4 before the roof 31 is placed on the side-members 4. The station 5 of the present mode of the invention can be used in either of these methods.

Next, the roof tacking station 6 will be described based on FIGS. 9-12. In station 6, a roof 31 suspended between side-members 4 in the roof coarse placement station 5 is properly positioned on the side-members 4 and tack-welded in place. This station comprises a suspension frame 34 placed astraddle of the body assembly line 2; a front and rear pair of suspension jigs 35 and 36 Removably/replacably placed on the suspension frame 34; fourth transporter robots 37-1 and 37-2 for transporting the suspension jigs 35 and 36; and welding robots 38-1 and 38-2 for spot-welding the roof 31 to the side-members 4.

Figure 11A:
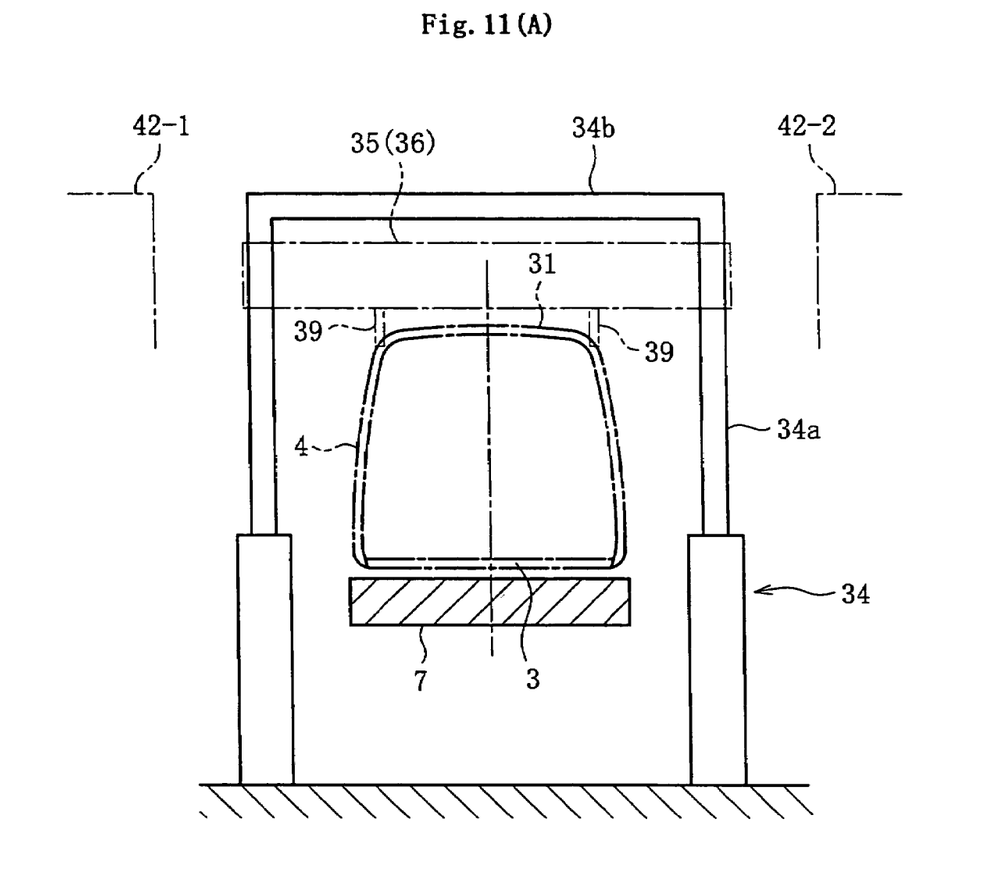
FIG. 11(A) is a front view of a roof tacking station.

The suspension frame 34 forms a positioning system made up of a left-right pair of suspension frame side sections 34a and a cross-connector beam 34b that straddles the body assembly line 2 and interconnects the suspension frame side sections 34a at their midpoints. The configuration is such that the ends of the suspension jigs 35 and 36 can be Removably/replacably placed in prescribed locations on top of the suspension frame side sections 34a The cross-connector beam 34b is provided solely to improve the lateral rigidity of the suspension frame 34. It may be eliminated if adequate lateral rigidity can be obtained using only the side sections 34a. That is, although we refer here to a "suspension frame," thus suggesting a framework, the cross-connector beam 34b is not necessarily required. As long as adequate lateral rigidity can be ensured using only the side sections 34a and 34b, one need not adhere to a strict interpretation of "suspension frame:" Any functionally equivalent structure may be used, as long as it will do the job. As shown in FIG. 11(A), a left-right pair of clamping jigs 39 are provided on the bottom surface of each of the suspension jigs 35 and 36, one near each end of each jig. The purpose of these clamping jigs 39 is to clamp, front and rear, the left side and right side welding edges of the roof 31 to the front and rear of the upper welding edges of the side-members 4, by using an open/close clamp jaw 52 driven by an air cylinder 51, shown in FIG. 11(B). To synchronize the timing of the opening and closing of each left-right pair of clamping jigs 39, they are connected to a common air supply system as a common motive power source, and to an electrical control system. The connection to the air and electrical systems is through couplers provided on positioners on the bottom surface at each end of each of the suspension jigs 35 and 36, configured such that as the suspension jigs 35 and 36 are placed on the suspension frame 34, a quick-connect/disconnect connection is made to air system and electrical system couplers on the suspension frame 34. Also shown in FIG.

Figure 11B:
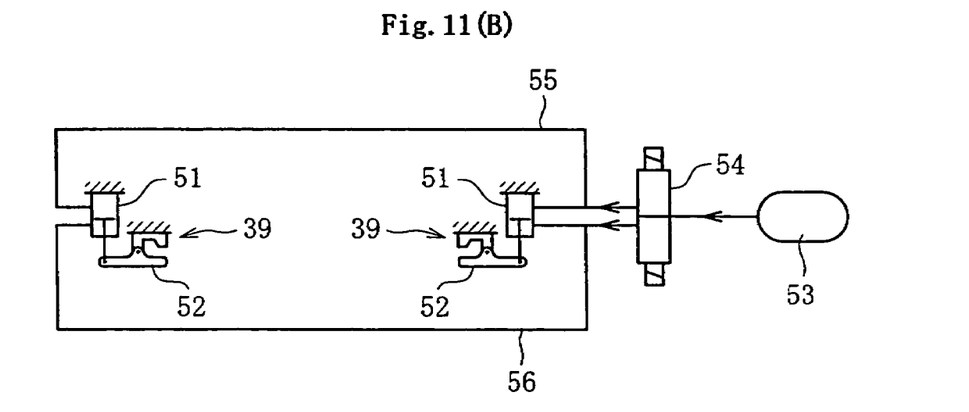
FIG. 11(B) is a simplified schematic diagram of a clamping jig drive system.

11(B) are a reserve air tank 53, a tandem electromagnetic valve 54, a clamp-opening air flow route 55, and a clamp-closing air flow route 56.

The underbody 3 and side-members 4, welded together in the previous step, are taken as a single unit, and a cart 7 on which the underbody 3 is mounted is fixed-positioned in a stationary system that includes the ground. If, in this state, the side-members 4 and a roof 31 that has been coarsely placed between, the tops of the side-members 4 are joined to each other by the suspension jigs 35 and 36, a total of four welding edge portion locations on the roof 31 and side-members 4 will have been fixed-positioned with respect to the stationary system through the suspension frame 34. Accordingly, eight locations fore and aft on the upper and lower welding edges of the side-members are all positioned with respect to the stationary system, and four welding edge locations at the corners of the roof 31 are all positioned with respect to the ground, and because the side-members 4 and roof 31 will be tack-welded in this positioned state, there will be no distortion of the front window opening 40 or the rear window opening 41, and the desired shapes for the front window opening 40 and rear window opening 41 are therefore assured.

In the conventional roof 31 tacking method, however, where left and right side-members are attached to the roof while the both side-members are clamped in large jigs, each upper welding edge of the left and right side-members 4 and the roof 31 is to be brought into contact simultaneously. Because of this, it was possible to have a slight timing difference between the clamping of the left and right side-members 4 to the roof 31, and this difference in clamp timing could result in distortion of the front window opening 40 and rear window opening 41. Regarding this point, in the present mode of the invention, because both the left and right clamping jigs 39 on a suspension jig (35 or 36) are driven by the same air system, the clamping operations near the upper left and right corners of the front window opening 40 and rear window opening 41 are performed at precisely the same time. This reduces distortion of the front window opening 40 and rear window opening 41 to an absolute minimum.

Also in the conventional side-member-4/roof-31 assembly method, the side-members 4 are handed-over (transferred) between handling units twice before arriving at the underbody 3. This can result in a slight warping of the side-members 4, and this warping can cause a slight clamp-positioning error when the side-members are clamped to the roof 31. Moreover, the roof 31 is lowered onto the top edges of the side-members 4 and set in place while clamped to the bottom of a large jig for support. Maintaining precise dimensional control of such a large and heavy jig requires complex mechanisms and highly skilled maintenance. Ultimately, it is during prototyping that the ability to mount glass in the front window opening 40 and the rear window opening 41 is checked. But when it comes to checking and making adjustments to correct for glass-mounting defects that have occurred, even when the most precise test and analysis equipment is used, it can be very difficult to narrow down the cause of the defect to faulty positioning of the underbody 3, a side-member 4 or the roof 31.

In the present mode of the invention, however, the side-members 4 are handed-over only once, which greatly reduces the possibility of warping. Also, because a stationary system is used as the reference for clamping the corners of the roof 31 to fore and aft portions of the upper welding edges of the side-members 4, the shape-wise and dimension-wise reliability of the front and rear window openings 40 and 41 is extremely high. In particular, the roof 31, with its upwardly convex shape and flexibility, is capable of a certain amount of expansion and contraction. Therefore, once the fore and aft portions of the upper welding edges of the side-members 4 have been accurately positioned with respect to the ground side of the stationary system (through the suspension jigs 35 and 36 and the suspension frame 34), even if there is a given amount of post-press residual distortion or warp in the shape of the roof 31 in areas other than at the periphery of the window openings 40 and 41, since this will have no effect on the shape of the window openings 40 and 41, even if, for example, there are problems with glass mounting defects that have occurred, analysis required to isolate the source of the problem, and the work required to correct the problem, will be far easier than in conventional methods.

Figure 12:
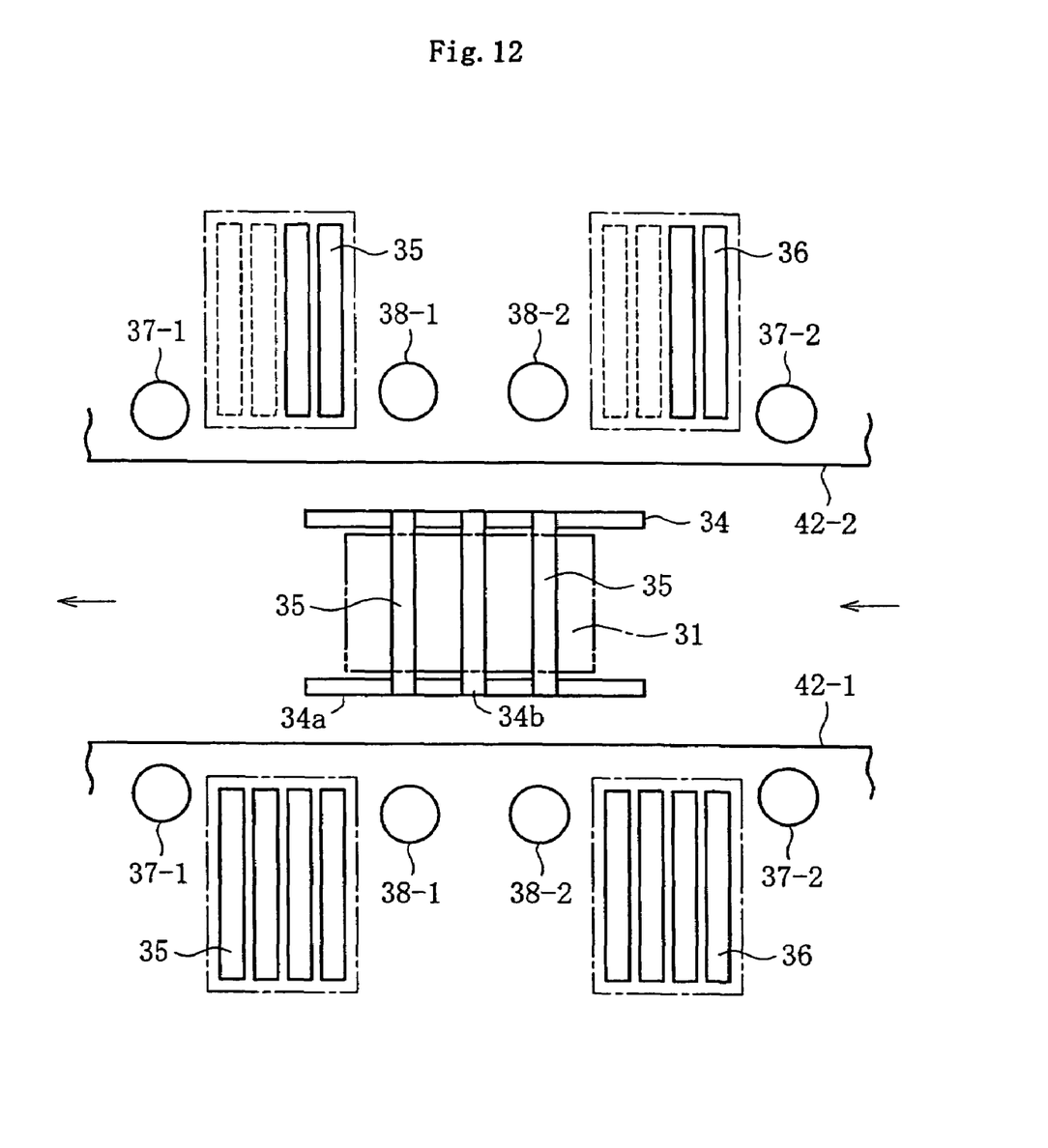
FIG. 12 is a plan view of a roof tacking station.

The clamping jigs 39 used on the suspension jigs 35 and 36 are model-specific, which means that retooling the line for a new model body requires a new set of clamping jigs 39. In the present mode of the invention, a number of suspension jigs 35 and 36 are set up with clamping jigs 39 to make them model-specific, and stocks of suspension jigs 35 and 36 for different body models are maintained near the fourth transporter robots 37-1 and 37-2. The height on the suspension frame 34 at which the suspension jigs 35 and 36 are attached is high above the plant floor. Therefore, for the stock area for the suspension jigs 35 and 36, and the mounting locations for the fourth transporter robots that 37-1 and 37-2 that transport them, it is preferred to construct racks 42-1 and 42-2 at approximately the same height as the suspension frame 34, and adjacent to the body assembly line 2, as shown in FIG. 11(A), and to set up the robots and suspension jigs on these racks. The suspension jig 35/36 stock area and transporter robots 37-1/37-2 may be provided on one rack (a rack 42-1 or a rack 42-2), but to support increases in the number of retoolings, and to reduce retooling tack time, a rack 42-2 may be constructed on the opposite side of the line [from the rack 42-1], and a stock area and robots 37-1 and 37-2 provided on this rack 42-2, as shown in FIG. 12. Basically, a single transporter robot 37-1 (37-2) can handle both the removal and replacement of suspension jigs 35 (36) for retooling operations, but efficiency in terms of retooling tack time can be improved by using separate transporter robots (on a rack 42-2 on the opposite side of the line, for example) for removal and replacement of the suspension jigs 35 and 36.

Also, because the suspension jigs 35 and 36 are placed at fore and aft portions of the roof 31, when facing directly toward a side-member 4, a relatively large accessible space is formed at each upper welding edge of the left and right side-members 4, between the fore and aft suspension jigs 35 and 36. Because of this, the roof 31 can be tack-welded to the side-members 4 using a relatively short reach if the welding robot is placed between transporter robots. Doing so makes it possible to reduce the size of the welding robots 38-1 and 38-2, and to simplify the structure of the welding jigs. Also, because there is good accessibility between the roof 31 and side-members 4, a finish-welding robot can be placed there in addition to the tack-welding robots, thus increasing the number of tasks that can be performed in one station, reducing the number of stations in the overall body assembly line 2, and shortening the body assembly line 2.

If we compare the suspension jigs 35 and 36 with a conventional roofjig, we note that like the side-member 4 jig, the conventional roofjig is a size larger than the roof 31, which increases initial plant costs and retooling time. In the present mode of the invention, however, the roofjig is oblong in shape and takes up less space. If appropriate racks, etc., are provided near the transporter robots 37-1 and 37-2, a large number of types of suspension jig 35 and 36 can be stocked in an extremely small area, thus reducing retooling time and eliminating the jig transporter equipment that is required in conventional methods.

The foregoing describes one mode of the invention, but the invention is not limited to this mode. A variety of modifications are possible. For example, in the described mode, side-members 4 are set in place on an underbody 3 by a first transporter robot 10-3. Any of a number of functionally equivalent transfer machines other than the transporter robot 10-3, however, could be used for this purpose. Also the number of jigs 11-1 through 11-4 need not be four: a different number of jigs may be used as required, for example, to support different body models.

The invention claimed is:

1. A vehicle body assembly method characterized in that on an underbody positioned in a prescribed position of a side-member tacking station having at least four clamping jigs therein, a left and right pair of side-members are placed by handling means in a vertically erect state without leaving the side-members to any jigs such that lower welding edges thereof are aligned with left and right welding edges of the underbody; and a total of at least four locations fore and aft on the lower welding edges of the vertically erect left and right side-members and the underbody, are joined together and clamped in place by the at least four clamping jigs that are separated from the handling means, for tack-welding the side-members to the underbody in this joined and clamped state.

2. A vehicle body assembly method characterized in that on an underbody positioned at a prescribed location in a vehicle body assembly line, a left and right pair of side-members are placed in a vertically erect state such that lower welding edges thereof are aligned with left and right welding edges of the underbody; and a total of at least four locations fore and aft on the lower welding edges of the vertically erect left and right side-members and the underbody, are joined together and clamped in place by at least four clamping jigs provided in prescribed locations, for tack-welding the side-members to the underbody in this joined and clamped state; wherein provided are slide plates, two fore and two aft, at the left and right sides of the prescribed location in the vehicle assembly line in which the underbody is positioned, facing toward the assembly line and moveable back and forth, for attachably/releasably loading clamping jigs thereon; and, a raiseable/lowerable elevator platform at the retracted position of each slide plate, for attachably/releasably loading the clamping jigs thereon; said method being such that the elevator platform is raised, and a clamping jig is transported to the raised elevator platform and loaded thereon by a robot, for transferring the clamping jig to a slide plate in its retracted position by lowering the elevator platform; the slide is then moved forward, and the side-members are joined and clamped to the underbody by the clamping jig; the elevator platform is again raised for placing thereon a different clamping jig, transported in advance thereto by a robot, for retooling purposes; and when retooling, the clamping jig on the slide plate in its forward position is lifted off by a robot, and the empty slide plate is retracted, after which the elevator platform is lowered, for transferring the next clamping jig onto the slide plate.

3. A vehicle body assembly method characterized in that it comprises a first step of using a first jig to position a left and right pair of side-members with respect to an underbody positioned in a prescribed location in a vehicle body assembly line, aligning lower welding edges of the side-members with left and right welding edges of the underbody and welding them; and a second step of releasing the first jig, then placing a cross-member such as a roof, header or frame-back between upper welding edges of the left and right side-members, and using a second jig for positioning, aligning the left and right welding edges of the cross-member with the upper welding edges of the left and right side-members, and welding the upper welding edges to the left and right welding edges in this positioned state.

4. A vehicle body assembly method characterized in that it comprises aligning lower welding edges of a left and right pair of side-members with left and right welding edges of an underbody positioned at a prescribed location in a vehicle body assembly line, and welding them; then, coarsely placing a cross-member such as a roof, header or frame-back between upper welding edges of the left and right side-members such that the left and right welding edges of the cross-member are aligned with the upper welding edges of the side-members; placing, transverse to and above the coarsely placed cross-member at one forward and one aft location thereof, suspension jigs, the two ends, left and right, of which are attachably/releasably supported on a suspension frame extending upward from the ground; and using a left and right pair of clamping jigs powered from a common source routed to the suspension jig, to join and clamp fore and aft portions of the upper welding edges of the side-members to fore and aft portions of the left and right welding edges of the cross-member, and tack-welding the welding edges of the side-members and cross-member in this joined and clamped state.

* * * * *